United States Patent [19]
Takanashi et al.

[11] Patent Number: 5,151,781
[45] Date of Patent: Sep. 29, 1992

[54] METHOD OF RECORDING COLOR IMAGE INFORMATION

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 727,633

[22] Filed: Jul. 10, 1991

[30] Foreign Application Priority Data

| Jul. 13, 1990 | [JP] | Japan | 2-186074 |
| Jul. 24, 1990 | [JP] | Japan | 2-196738 |
| Jul. 24, 1990 | [JP] | Japan | 2-196741 |

[51] Int. Cl.⁵ ............ H04N 3/15; H04N 5/30; H04N 9/07; G02F 1/135
[52] U.S. Cl. .......................... 358/45; 359/68
[58] Field of Search ........ 358/75, 81, 43, 44, 358/45, 909; 395/68, 491; 355/32, 35, 38

[56] References Cited

U.S. PATENT DOCUMENTS 4,780,735 10/1988 Taniguchi .
5,065,250 11/1991 Takanashi .................. 358/909

FOREIGN PATENT DOCUMENTS 1178919 7/1989 Japan .
2576 1/1990 Japan .
240612 2/1990 Japan .
240613 2/1990 Japan .
240616 2/1990 Japan .
240617 2/1990 Japan .
240618 2/1990 Japan .
240619 2/1990 Japan .
1154120 6/1990 Japan .

Primary Examiner—George H. Miller, Jr.
Assistant Examiner—Scott A. Rogers
Attorney, Agent, or Firm—Pollock, VandeSande & Priddy

[57] ABSTRACT

Color image information is recorded on a recording medium. The recording medium includes a color stripe filter having different-color filter stripes. Marks are provided on the recording medium in correspondence with the filter stripes of the color stripe filter. A detection is given of the marks on the recording medium. During the recording of the color image information, color line sequential signals are recorded on the recording medium. The recording of the color line sequential signals is synchronized with the detection of the marks on the recording medium.

3 Claims, 13 Drawing Sheets

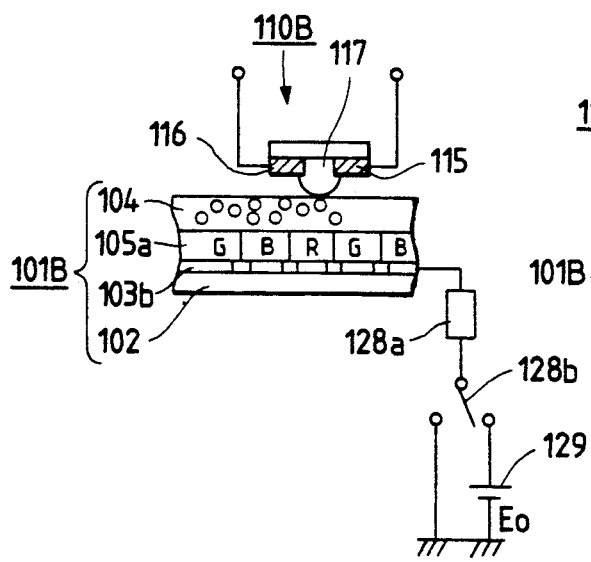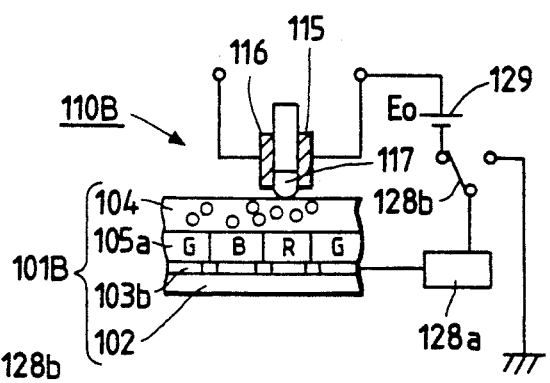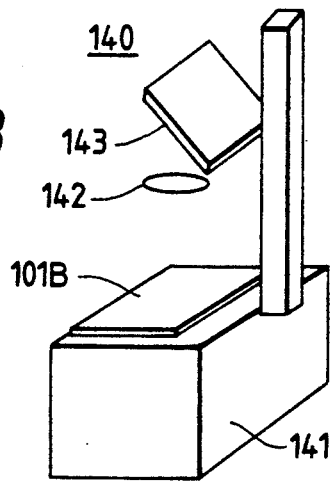

METHOD OF RECORDING COLOR IMAGE INFORMATION

BACKGROUND OF THE INVENTION

This invention relates to a method of recording color image information.

Some of information recording mediums are provided with a color stripe filter having different-color filter stripes. During a reproducing process, recorded color image information is read out from the recording medium via the color stripe filter so that the color image information can be reproduced.

In cases where color-separated line segments of a color image are sequentially recorded on such a recording medium, it is important to accord the colors of the line segments of the color image with the colors of the stripes of the color stripe filter for a good color quality and a high resolution of a corresponding reproduced image. Such an accordance needs to be more accurate for a better color quality and a higher resolution of the reproduced image.

SUMMARY OF THE INVENTION

It is an object of this invention to provide a good method of recording color image information.

A first aspect of this invention provides a method of recording color image information on a recording medium including a color stripe filter having different-color filter stripes, comprising the steps of providing marks on the recording medium in correspondence with the filter stripes of the color stripe filter; detecting the marks on the recording medium; recording color line sequential signals on the recording medium; and synchronizing said recording of the color line sequential signals with said detecting of the marks on the recording medium.

A second aspect of this invention provides a method of recording color image information on a recording medium including a color stripe filter having different-color filter stripes, comprising the steps of providing an electrode in the recording medium, the electrode having separated stripes corresponding to the respective filter stripes of the color stripe filter; sequentially feeding different-color line sequential signals to a recording head to sequentially record the line sequential signals on the recording medium; and sequentially applying a voltage to the stripes of the electrode in accordance with a change between the different-color line sequential signals.

A third aspect of this invention provides a method of recording color image information on a recording medium including a color stripe filter having different-color filter stripes, comprising the steps of applying light to a recording head via the recording medium; sequentially feeding different-color components of image information to the recording head; and changing a color of the light in accordance with a change between the different-color components of the image information.

BRIEF DESCRIPTION OF THE DRAWINGS

FIG. 16 is a diagram of a part of an information recording apparatus.

FIG. 17 is a diagram of a part of an information recording apparatus.

FIG. 18 is a perspective view of an information reproducing apparatus.

DESCRIPTION OF THE PREFERRED EMBODIMENTS

Figure 1:
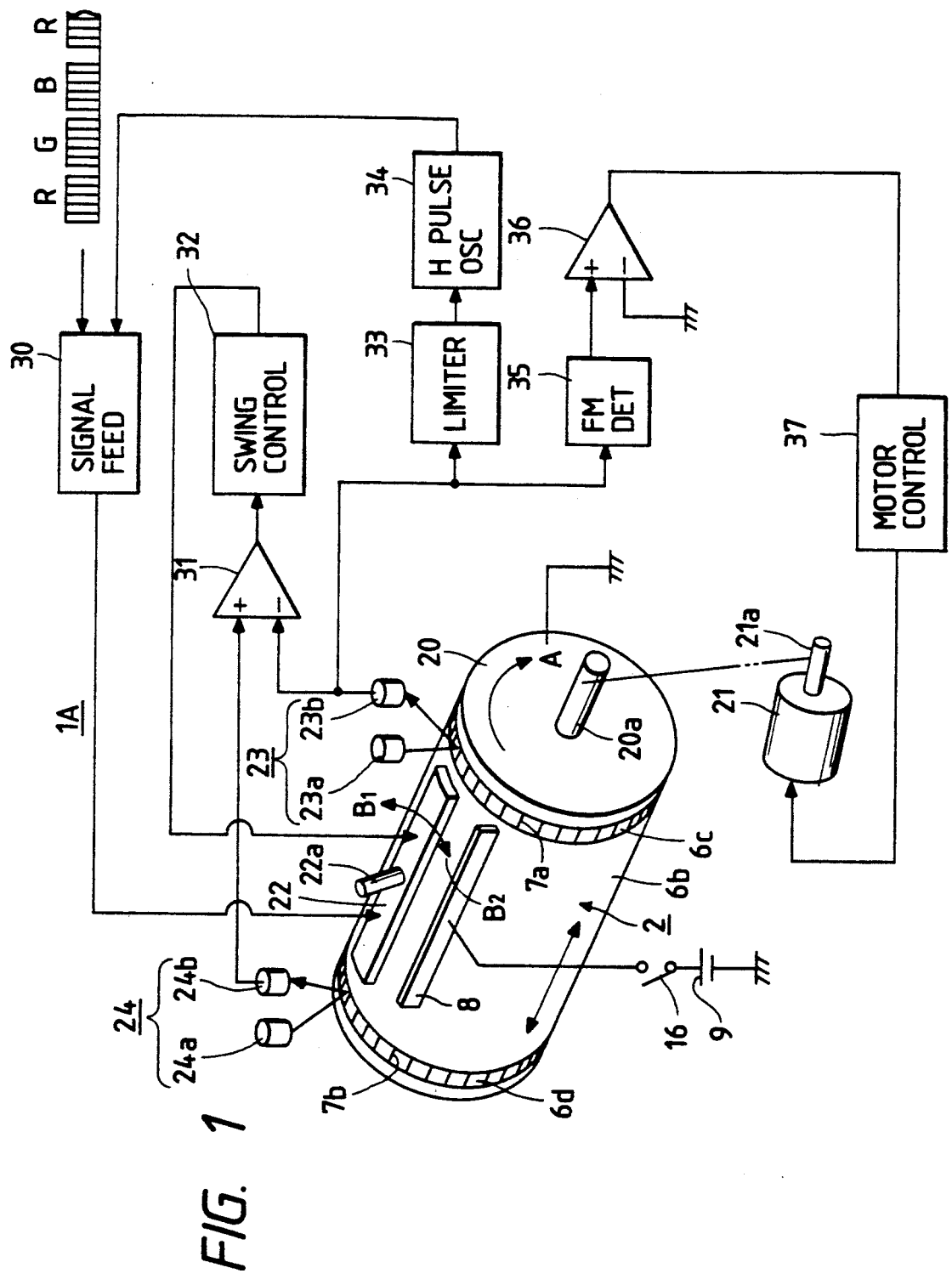
FIG. 1 is a diagram of an information recording apparatus.
Figure 2:
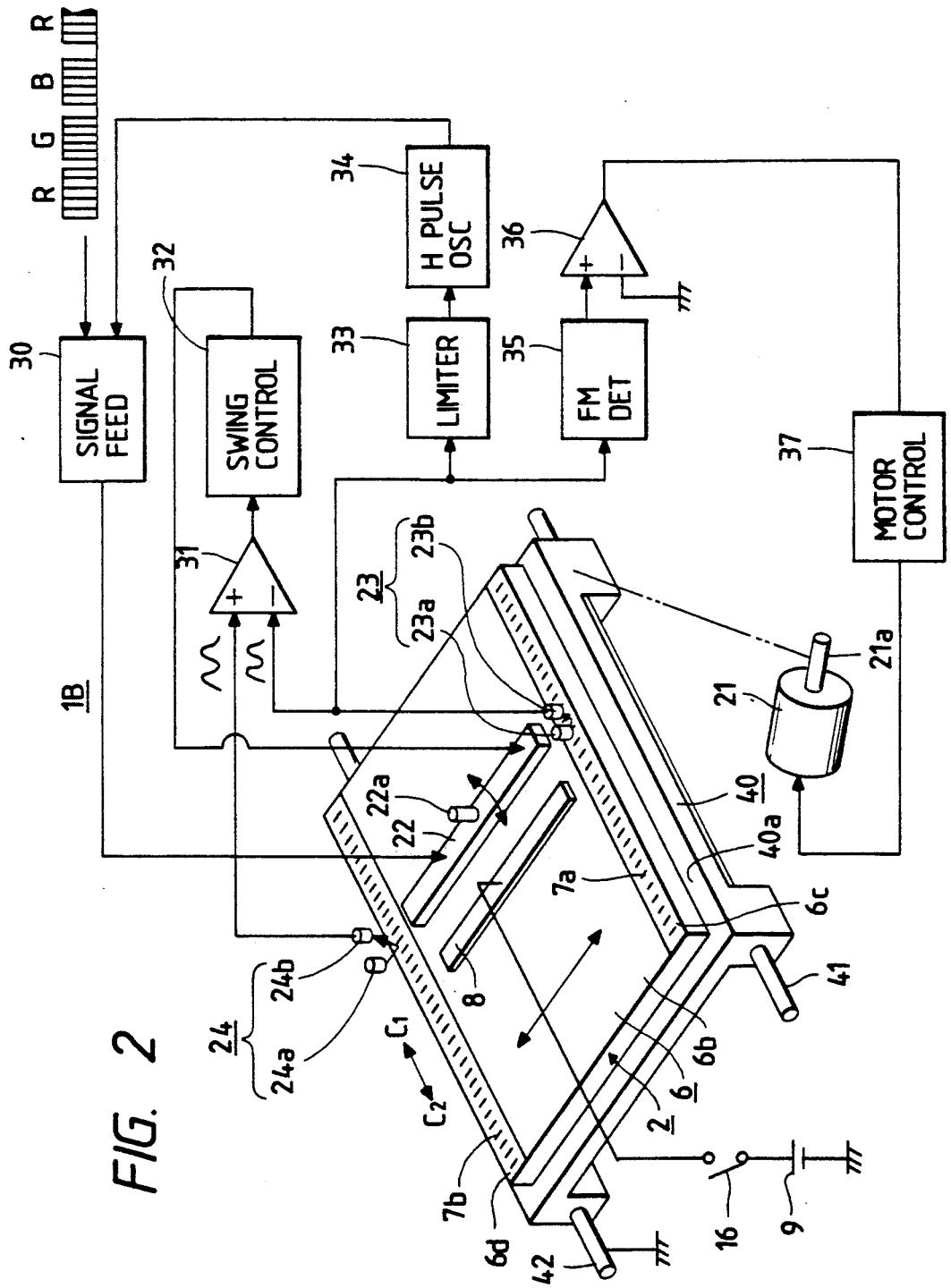
FIG. 2 is a diagram of an information recording apparatus.

With reference to FIG. 1, an image forming apparatus (an information recording apparatus) 1A includes a recording medium 2 which is wound around a drum 20. With reference to FIG. 2, an image forming apparatus (an information recording apparatus) 1B includes a recording medium 2 which is placed on a flat carriage 40.

Figure 3:
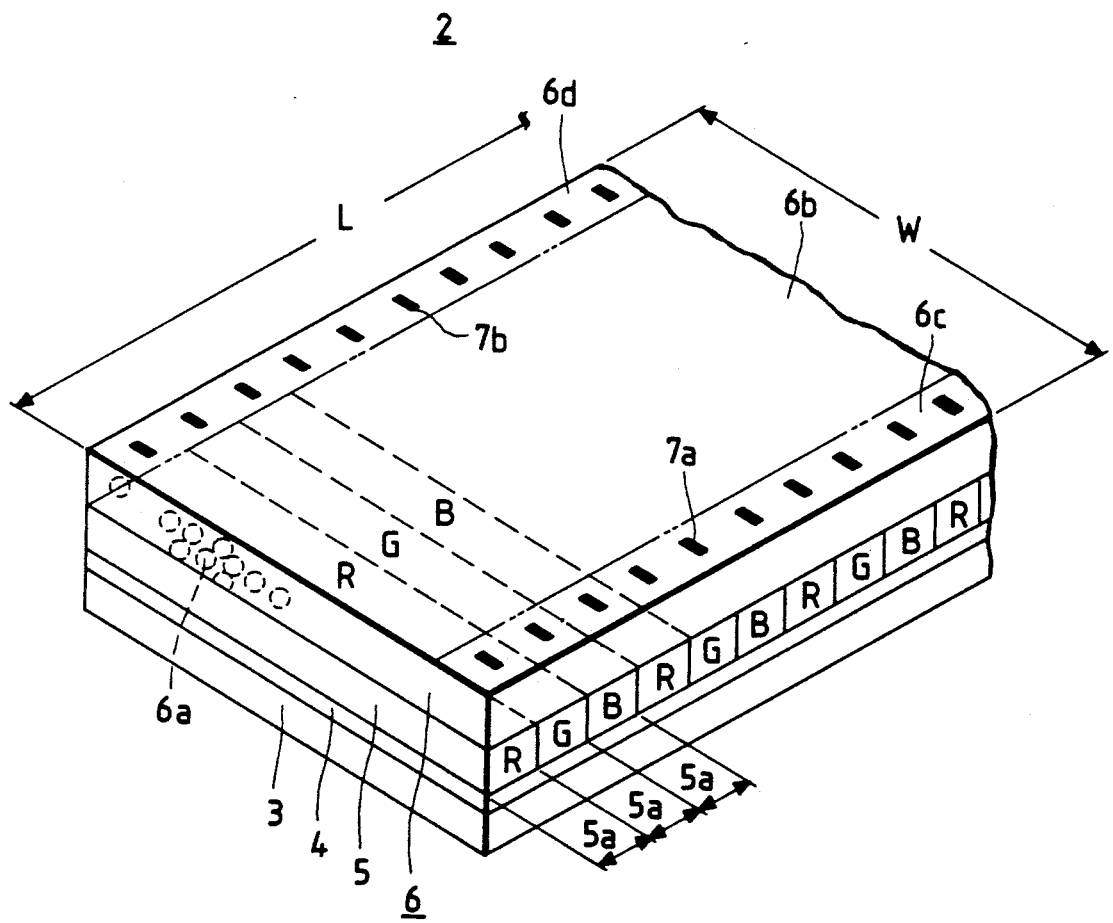
FIG. 3 is a perspective view of a recording medium.

A method of manufacturing a recording medium 2 is of the following two types. In the first type, a recording medium 2 is made as a flat plate as shown in FIG. 3, and then the recording medium 2 is wound around the drum 20 or placed on the carriage 40. In the second type, a recording medium 20 is formed integrally with the drum 20 or the carriage 40. There is no difference between the two types in the basic design of the recording medium 20, and the principles of erasing, recording, and reproducing processes.

With reference to FIG. 3, in the recording medium 2, a base plate 3, an electrode 4, a color stripe filter 5, and a scatter mode photo-modulation member 6 are formed in a laminated structure in the shown order by a known technique.

The base plate 3 is made of transparent PET (polyethylene terephthalate) material. The electrode 4 which is composed of an ITO (indium tin oxide) film is superposed on the base plate 3.

The color stripe filter 5 is superposed on the electrode 4. The color stripe filter 5 includes recurrent groups each having filter stripes of colors which correspond to color components of an information signal fed to a thermal head 22 (see FIG. 1 and FIG. 2) described later. The recurrent groups of the filter stripes are arranged along a longitudinal direction L of the recording medium 2. In the case where the color components of the information signal fed to the thermal head 22 correspond to a red signal component, a green signal component, and a blue signal component, the colors of the filter stripes in one group correspond to red, green, and blue. In this case, as shown in the drawing, the red filter stripes R, the green filter stripes G, and the blue filter stripes B are formed linearly along a width direction W of the recording medium 2. In addition, the filter stripes R, G, and B extend along a main scanning direction in which heating resistors of the thermal head 22 are arranged. The filter stripes R, G, and B have filter stripe widths 5a comparable to the size of the heating resistors of the thermal head 22.

The colors of the color stripe filter 5 are not limited to red, green, and blue, and may be other colors. The sequence of the layers in the lamination is not limited to the previously-mentioned sequence. For example, it is good to use the structure in which the uppermost layer is the color stripe filter 5 and the scatter mode photo-modulation member 6 is formed below the color stripe filter 5. Furthermore, it is good to use a recording medium 2' which has no electrode as shown in FIG. 4(B). In this case, an erasing electric field is applied from the exterior.

The scatter mode photo-modulation member 6 is superposed on the color stripe filter 5, and is the uppermost layer in the drawing. The scatter mode photo-modulation member 6 is made of scatter-type photo-modulation material which exhibits the following characteristics. By heating the scatter mode photo-modulation member 6, the optical characteristics of the photo-modulation member 6 change to opaque conditions where it scatters light. In addition, the scattering conditions (the opaque conditions) remain after the photo-modulation member 6 cools down. Furthermore, by applying an electric field to the photo-modulation member 6, the photo-modulation member 6 is changed to a transparent state. After the electric field is removed, the transparent state remains.

The material constituting the scatter mode photo-modulation member 6 is selected from a material containing a complex film of high molecular material and liquid crystal material, a material containing a liquid crystal film, a material containing a ferroelectric liquid crystal film, a PLZT ceramics, a $BaTiO_3$ ferroelectric crystal, a $LiNiO_3$ ferroelectric crystal, a polyvinylidene fluoride ferroelectric material, and a trifluoride ethylene copolymer. In addition, the scatter mode photo-modulation member 6 and the material constituting the scatter mode photo-modulation member 6 may be those shown in U.S. patent application Ser. No. 542,213 filed on Jun. 22, 1990, the disclosure of which is hereby incorporated by reference.

During an erasing process, a recording process, or a reproducing process, the recording medium 2 is changeable between an opaque state where the recording medium 2 scatters light and a transparent state where the recording medium 2 transmits light.

A description will be given of the case where the scatter mode photo-modulation member 6 is composed of a complex film of high molecular material and liquid crystal material. The high molecular material in the photo-modulation complex film 6 is selected from various substances such as methacrylic resin, polyester resin, vinyl chloride resin, polyamide resin, polyethylene resin, polypropylene resin, polystyrene resin, and silicone resin. The high molecular material has pores or small holes 6a filled with nematic liquid crystal. The photo-modulation complex film 6 may be a mixture of acrylic resin and smectic liquid crystal.

The small holes 6a in the photo-modulation complex film 6 have diameters equal to or smaller than about 0.5 micrometers, so that image information can be recorded at a high resolution. When the photo-modulation complex film 6 is heated, the photo-modulation complex film 6 is changed to an opaque state where the photo-modulation complex film 6 scatters light. When an electric field is applied to the photo-modulation complex film 6, the photo-modulation complex film 6 is changed to a transparent state where the photo-modulation complex film 6 transmits light.

The upper surface of the photo-modulation complex film 6 is separated into a recording surface 6b and color stripe filter detecting surfaces 6c and 6d. The recording surface 6b is subjected to a recording process by the thermal head 22 (see FIG. 1 and FIG. 2).

The color stripe filter detecting surfaces 6c and 6d extend in the direction of the length L of the photo-modulation complex film 6 and along the opposite sides of the photo-modulation complex film 6 with respect to the direction of the width W of the photo-modulation complex film 6. The color stripe filter detecting surfaces 6c and 6d are formed with detection marks 7a and 7b which lie in positions corresponding to the positions of the filter stripes R, G, and B of the color stripe filter 5. The detection marks 7a and 7b are formed in a known printing technique by which black inks are printed symmetrically on the opposite sides, that is, printed on equal-shape and equal-position regions in correspondence with the positions of the filter stripes R, G, and B. The pitch of the detection marks 7a and 7b corresponds to the pitch of the filter stripes R, G, and B. The pitch of the detection marks 7a and 7b may correspond to the pitch of groups each having a filter stripe R, a filter stripe G, and a filter stripe B. The detection marks 7a and 7b may be set arbitrarily. The color of the detection marks 7a and 7b may be set arbitrarily.

A description will be given of the principle of an erasing process, a recording process, and a reproducing process in connection with the recording medium 2.

Figure 4A:
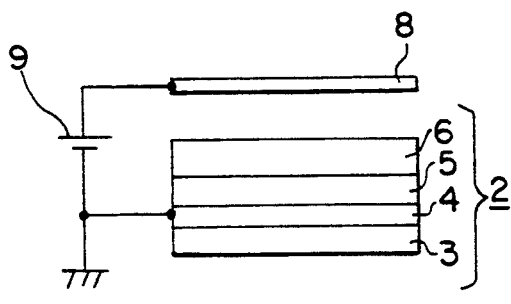
FIGS. 4A and 4B are a diagram showing recording mediums.
Figure 4B:
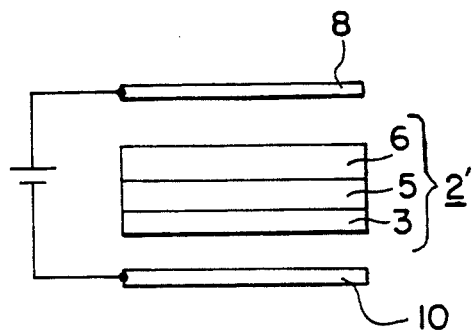

As shown in FIG. 4(A), an electrode 8 is located above the recording medium 2 and is opposed to the recording medium 2. A power supply 9 is connected between the electrode 8 and the electrode 4 of the recording medium 2 so that an electric field is applied to the recording medium 2. The following design may be used. As shown in FIG. 4(B), the recording medium 2' does not have an electrode 4 and the electrode 4 is replaced by an electrode 10 which is provided below the base plate 3, and an electric field is applied between the electrode 8 and the electrode 10. When the electric field is applied to the recording medium 2, the liquid crystal in the small holes 6a of the photo-modulation complex film 6 is oriented in the direction of the electric field so that the photo-modulation complex film 6 is changed to the transparent state. This process is used in erasing the recorded information from the recording medium 2. Another erasing process described hereinafter may be used. A corona charger (not shown) substituting for electrodes is located above the photo-modulation complex film 6 of the recording medium 2, and the corona charger is driven to scan the recording medium 2.

Figure 5:
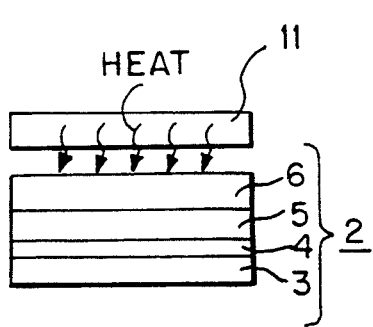
FIG. 5 is a diagram showing a recording medium.

As shown in FIG. 5, a heating member 11 is located above the recording medium 2 and is opposed to the recording medium 2 so that the recording medium 2 can be heated. When the recording medium 2 is heated, the liquid crystal in the small holes 6a of the photo-modulation complex film 6 is moved into an isotropic phase state. Then, the liquid crystal is cooled while remaining in the isotropic phase state. As a result, the liquid crystal becomes in the opaque state. This process is used in recording information on the recording medium 2. The heating resistors in the thermal head 22 (see FIG. 1 and FIG. 2) are used as the heating member 11.

Figure 6:
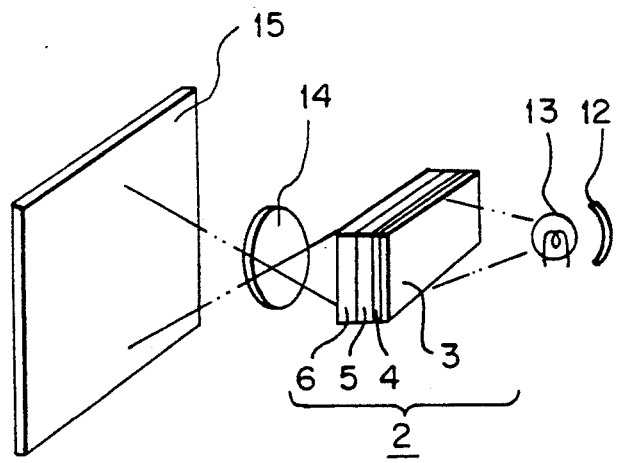
FIG. 6 is a diagram of an information reproducing apparatus.

FIG. 6 shows a process of reproducing previously-recorded information from the recording medium 2. As shown in FIG. 6, a light source 13 emits a reading light beam, which is applied via a reflector 12 to the recording medium 2 from the rear of the base plate 3. The reading light beam passes through the recording medium 6, being projected onto a screen 15 via a lens 14 provided at a side of the photo-modulation complex film 6. This process is base on the operation of a transmission-type projector.

In the case where the base plate 3 of the recording medium 2 is made of opaque material, the reproducing process is based on the operation of a reflection-type projector.

The embodiments of this invention will be further described. As shown in FIG. 1, the image forming apparatus 1A includes the recording medium 2 which is wound on the circumferential surface of the drum 20.

The drum 20 is composed of a metal cylinder, being rotatable about a shaft 20a in the direction A. The shaft 20a of the drum 20 is connected to a shaft 21a of a drive motor 21 by a known transmission mechanism such as a combination of a belt and pulleys. When the drive motor 21 is activated, the drum 20 is rotated in the direction A.

The recording medium 2 wound on the drum 20 has the base plate 3, the electrode 4, the color stripe filter 5, and the photo-modulation complex film 6 (see FIG. 3). In the case where the electrode 4 is formed by the metal drum 20, an arrangement similar to the recording medium 2' of FIG. 4(B) is provided.

Above the recording surface 6b of the recording medium 2, there are provided an erasing electrode 8 and a recording head 22 (referred to as a thermal head 22 hereinafter) which extend along the shaft 20a of the drum 20.

The electrode 8 precedes the thermal head 22 in the direction of the rotation of the drum 20. The electrode 8 is connected to one side of a power supply 9 via a switch 16, and the other side of the power supply 9 is grounded. In the case where the recording medium 2 is used, the electrode 4 (see FIG. 3) of the recording medium 2 is connected to a metal part of the drum 20 by a suitable member (not shown), and the drum 20 is grounded. Also, in the case where the recording medium 2' (see FIG. 4(B)) is used, the drum 20 is grounded.

During an erasing process which is executed before the execution of a recording process, the switch 16 is closed and thus a voltage is applied from the power supply 9 to the electrode 8 in accordance with the previously-mentioned principle of the erasing process. In the case where the drum 20 is rotated through 360 degrees, image information recorded on the recording surface 6b of the recording medium 2 is completely erased. It is possible to erase previous information from the recording surface 6b of the recording medium 2 and simultaneously record new information on the recording surface 6b of the recording medium 2. In this case, it is unnecessary to execute the erasion of the full information before the execution of the recording process.

As described previously, the thermal head 22 which serves as a recording head is provided above the recording surface 6b of the recording medium 2. The thermal head 22 is fixed by a suitable device (not shown). As the drum 20 is rotated in the direction A (the thermal head sub scanning direction), the thermal head 22 can record light information on the recording medium 2 wound on the drum 20. The thermal head 22 is designed so as to be able to swing even when the thermal head 22 is in a fixed state.

The thermal head 22 has an arrangement of heating resistors which extends linearly in the main scanning direction. The heating resistors are designed so that the information recording can be performed at a resolution of about 8 dot/mm to 16 dot/mm. During an information recording process, an image information signal is fed to the thermal head 22. Furthermore, heat generated by the heating resistors of the thermal head 22 is applied to the recording medium 2 and thus the image information signal is recorded on the recording medium 2 in accordance with the previously-mentioned principle of the recording process. By controlling the energy to the heating resistors of the thermal head 22 in response to the light information, image information having a variable tone level can be recorded on the recording medium 2.

A mechanism for detecting the position of the color stripe filter 5 will be explained hereinafter. The position detecting mechanism includes photosensors 23 and 24 which serve to detect the detection marks 7a and 7b on the color stripe filter detecting surfaces 6c and 6d of the recording medium 2. Specifically, the photosensors 23 and 24 are located in positions being close to the detection marks 7a and 7b and corresponding to the recording position of the thermal head 22. The photosensor 23 includes a combination of a light emitting section 23a and a light receiving section 23b. The photosensor 24 includes a combination of a light emitting section 24a and a light receiving section 24b. Light beams emitted from the light emitting sections 23a and 24a are reflected by the detection marks 7a and 7b, being incident to the light receiving sections 23b and 24b and generating outputs dependent on the positions of the detection marks 7a and 7b.

The positions of the filter stripes R, G, and B of the color stripe filter 5 are controlled so as to match the color components of the image information signal to the thermal head 22 in response to the outputs from the light receiving sections 23b and 24b which depend on the positions of the detection marks 7a and 7b. A mechanism for executing this control will be explained hereinafter.

During the recording process, this control mechanism executes thermal head swinging control, line sequential signal feed control, and drive motor rotation control. The thermal head swinging control is designed so that the opposite ends of the thermal head 22 can be held in parallel with the filter stripes R, G, and B. The line sequential signal feed control is designed so that the image information signal can be fed to the thermal head 22 in accordance with the sequence of the repeat of the filter stripes R, G, and B. The drive motor rotation control is designed so that the rotation of the drum 20 can be controlled suitably.

During the thermal head swinging control, the light beams emitted from the light emitting sections 23a and 24a are reflected by the detection marks 7a and 7b, being incident to the light receiving sections 23b and 24b. The outputs from the light receiving sections 23b and 24b are fed to an operation amplifier 31. The operation amplifier 31 compares the output of the light receiving section 23b and the output of the light receiving section 24b. The operation amplifier 31 generates an output which represents the result of the comparison. The output of the operation amplifier 31 is fed via a thermal head swinging controller 32 to a swinging mechanism of the thermal head 22. The center of the thermal head 22 is provided with a shaft 22a, and the thermal head 22 can rotate about the shaft 22a in a small angular range along the directions B1 and B2. The swinging mechanism serves to rotate the thermal head 22 about the shaft 22a in the limited angular range. The swinging mechanism includes an actuator such as a piezoelectric drive device or a motor.

When the swinging mechanism of the thermal head 22 is fed with the output from the operational amplifier 36 which represents the result of the comparison between the outputs of the light receiving sections 23b and 24b, the thermal head 22 is rotated about the shaft 22a in the direction of nullifying the phase difference between the outputs of the light receiving sections 23b and 24b. In other words, the thermal head 22 is rotated slightly in the direction B1 or the direction B2. During the recording of R (red) components of the image information signal, the thermal head swinging control holds the opposite ends of the thermal head 22 in parallel with the filter stripe R, so that the detection marks 7a and 7b of the filter stripe R are held in equal positions at the opposite ends. Thus, the R components of the image information signal is recorded accurately along the filter stripe R. Similarly, in a subsequent control operation, G (green) components of the image information signal and B (blue) components of the image information signal are sequentially and periodically controlled. The photosensors 23 and 24 may be provided integrally with the opposite ends of the thermal head 22. In this case, the thermal head swinging control is of the closed-loop type so that a higher control accuracy can be attained.

During the line sequential signal feed control, the photosensor 23 is used as a reference, and the position of a filter stripe firstly subjected to a recording process, for example, the position of a filter stripe R, is detected. Then, the detection marks 7a are sequentially counted in correspondence with the position of a filter stripe G and the position of a filter stripe B. The output of the light receiving section 23b of the photosensor 23 is wave-shaped by a limiter 33. The output from the limiter 33 is fed to an H pulse oscillator 34, and the H pulse oscillator 34 outputs reference H pulses. A line sequential signal fed section 30 receives the R, G, and B components of the image information signal being an recorded object. In addition, the line sequential signal feed section 30 receives the H pulses. The line sequential signal feed section 30 sequentially feeds the R components, the G components, and the B components to the thermal head 22 in response to the H pulses.

In the case where the R components of the information signal are fed to the thermal head 22 as color components to be recorded firstly, the thermal head 22 is located above a filter stripe R of the color stripe filter 5 and the R components of the information signal is recorded on the recording medium 2 by the heat generated from the heating resistors in the thermal head 22. Subsequently, the G components of the information signal and the B components of the information signal are controlled so as to correspond to a filter stripe G and a filter stripe B respectively. The above-mentioned processes are sequentially reiterated, and thereby all the light information is recorded on the recording medium 2.

The length L (see FIG. 3) of the recording medium 2 is chosen so that at least one frame of the image information can be recorded on the recording medium 2. In general, the recorded image information relates to a still picture. In the recording of a moving image, image information is previously stored into a frame memory (not shown), and the image information is sequentially fed to the thermal head 22.

The output of the light receiving section 23b of the photosensor 23 is fed to a drive motor controller 37 via an FM detector 35 and an operational amplifier 36. The drive motor 21 is subjected to rotation control responsive to the output from the drive motor controller 37. Thus, the drum 20 is rotated in response to the output from the light receiving section 23b of the photosensor 23 which gives a reference of the control, so that the R components, the G components, and the B components of the information signal can be held in agreement with the positions of the filter stripes R, the filter stripes G, and the filter stripes B respectively.

As shown in FIG. 2, the image forming apparatus 1B includes the recording medium 2 placed on the flat carriage 40.

The carriage 40 is made of metal, having an upper flat surface 40a. The carriage 40 is slidably mounted on a pair of guide rails 41 and 42. The carriage 40 is connected to the shaft 21a of the drive motor 21 by a known transmission mechanism such as a combination of gears, a belt, and pulleys. As the drive motor 21 is rotated, the carriage 40 is slid linearly in the directions C1 and C2.

The electrode 8 and the thermal head 22 are fixed above the recording medium 2 carried on the carriage 40.

In the case where the direction of the movement of the carriage 40 which occurs during the recording process is set as the direction C1 (the thermal head sub scanning direction), the erasing electrode 8 is located at a position shown in the drawing. Specifically, the electrode 8 precedes the thermal head 22 in the direction of the movement of the carriage 40 which occurs during the recording process.

The operation of the image forming apparatus 1B is similar to the operation of the image forming apparatus 1A except for the following points. During the recording process, the carriage 40 is moved in the direction C1. When the recording process is completed, the carriage 40 is returned in the direction C2. During the return of the carriage 40, the erasing process may be done.

Figure 7:
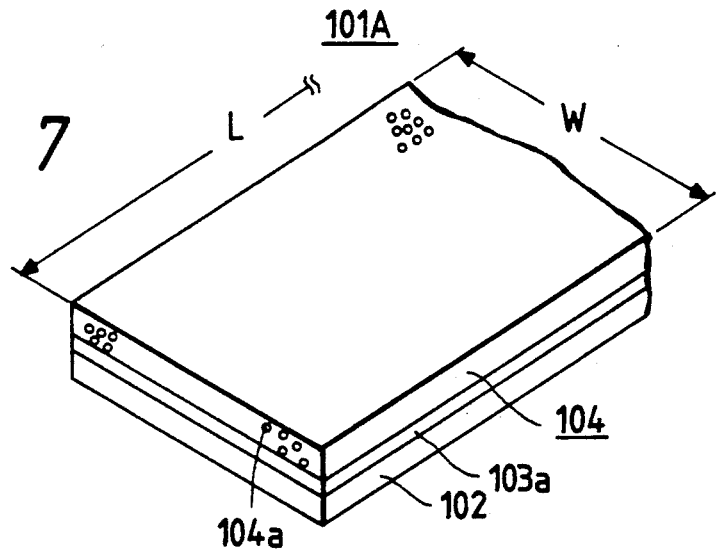
FIG. 7 is a perspective view of a recording medium.

With reference to FIG. 7, a recording medium 101A includes a base plate 102, an electrode 103a, and a scatter mode photomodulation member 104.

Figure 8:
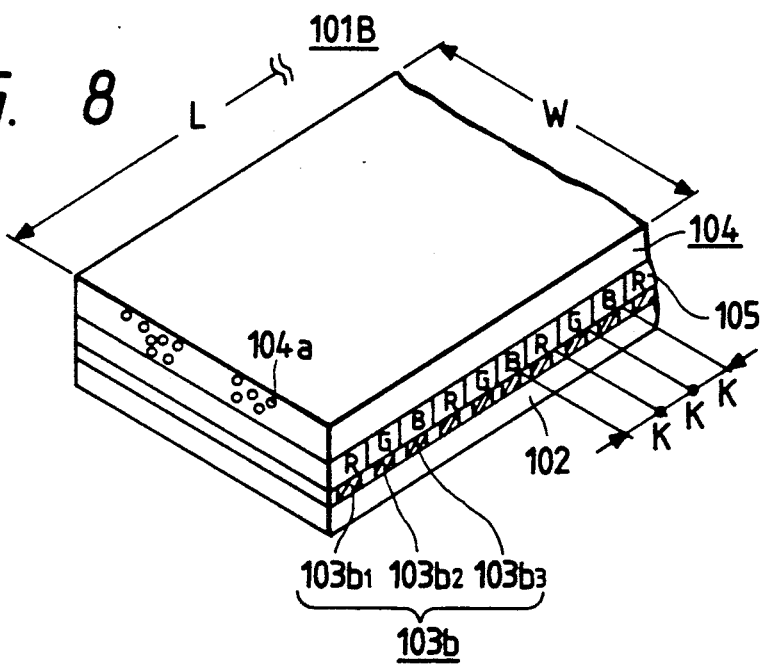
FIG. 8 is a perspective view of a recording medium.

With reference to FIG. 8, a recording medium 101B includes a base plate 102, electrodes 103b, a color stripe filter 105, and a scatter mode photo-modulation member 104.

In FIGS. 7 and 8, the base plate 102 is made of transparent PET (polyethylene terephthalate) material, being formed into a flat plate.

In FIGS. 7 and 8, the electrodes 103a and 103b are composed of ITO (indium tin oxide) films formed on the base plate 102. In FIG. 7, the electrode 103a has the form of a flat film. In FIG. 8, the electrodes 103b are stripe-shaped, being separated from each other in correspondence with a plurality of color components of an image information signal.

In FIGS. 7 and 8, the scatter mode photo-modulation member 104 is made of scatter-type photo-modulation material which exhibits the following characteristics. By heating the scatter mode photo-modulation member 104, the optical characteristics of the photo-modulation member 104 change to opaque conditions where it scatters light. In addition, the scattering conditions (the opaque conditions) remain after the photo-modulation member 104 cools down. Furthermore, by applying an electric field to the photo-modulation member 104, the photo-modulation member 104 is changed to a transparent state. After the electric field is removed, the transparent state remains.

The material constituting the scatter mode photo-modulation member 104 is selected from a material containing a complex film of high molecular material and liquid crystal material, a material containing a liquid crystal film, a material containing a ferroelectric liquid crystal film, a PLZT ceramics, a $BaTiO_3$ ferroelectric crystal, a $LiNiO_3$ ferroelectric crystal, a polyvinylidene fluoride ferroelectric material, and a trifluoride ethylene copolymer. In addition, the scatter mode photo-modulation member 104 and the material constituting the scatter mode photo-modulation member 104 may be those shown in U.S. patent application Ser. No. 542,213 filed on Jun. 22, 1990, the disclosure of which is hereby incorporated by reference.

During an erasing process, a recording process, or a reproducing process, the recording medium 101A or 101B is changeable between an opaque state where the recording medium 101A or 101B scatters light and a transparent state where the recording medium 101A or 101B transmits light.

A description will be given of the case where the scatter mode photo-modulation member 104 is composed of a complex film of high molecular material and liquid crystal material. The high molecular material in the photo-modulation complex film 104 is selected from various substances such as methacrylic resin, polyester resin, vinyl chloride resin, polyamide resin, polyethylene resin, polyproylene resin, polystyrene resin, and silicone resin. The high molecular material has pores or small holes 104a filled with nematic liquid crystal. The photo-modulation complex film 104 may be a mixture of acrylic resin and smectic liquid crystal.

The small holes 104a in the photo-modulation complex film 104 have diameters equal to or smaller than about 0.5 micrometers, so that image information can be recorded at a high resolution. When the photo-modulation complex film 104 is heated, the photo-modulation complex film 104 is changed to an opaque state where the photo-modulation complex film 104 scatters light. When an electric field is applied to the photo-modulation complex film 104, the photo-modulation complex film 104 is changed to a transparent state where the photo-modulation complex film 104 transmits light.

In FIG. 7, the photo-modulation complex film 104 is superposed on the electrode 103a. In FIG. 8, the photo-modulation complex film 104 is superposed on the color stripe filter 105.

In FIG. 8, the color stripe filter 105 is layered between the electrodes 103b and the photo-modulation complex film 104. The color stripe filter 105 may be layered on the photo-modulation complex film 104. The color stripe filter 105 includes recurrent groups each having filter stripes of colors which correspond to color components of an image information signal fed to a recording head 110A and 110B (see FIG. 10 and FIG. 11) described later. The recurrent groups of the filter stripes are arranged along a longitudinal direction L of the recording medium 101B. In the case where the color components of the image information signal fed to the recording head 110A and 110B correspond to a red signal component, a green signal component, and a blue signal component, the colors of the filter stripes in one group correspond to red, green, and blue. In this case, as shown in the drawing, the red filter stripes R, the green filter stripes G, and the blue filter stripes B are formed linearly along a width direction W of the recording medium 101B. In addition, the filter stripes R, G, and B extend along a main scanning direction in which separated electrodes 112 (see FIG. 10) of the recording head 110A or heating resistors 117 (see FIG. 11) of the recording head 110B are arranged. Thus, the longitudinal direction of the filter stripes R, G, and B agrees with the longitudinal direction of the recording heads 110A and 110B.

The filter stripes R, G, and B have filter stripe widths K comparable to the size of the separated electrodes 112 of the recording head 110A and the size of the heating resistors 117 of the recording head 110B. In general, the size of the separated electrodes 112 or the size of the heating resistors 117 is chosen so as to correspond to a density or resolution of about 8 dot/mm to 16 dot/mm. The colors of the color stripe filter 105 are not limited to red, green, and blue, and may be other colors.

The recording medium 101A and the recording medium 101B will be further described. In FIG. 7, the recording medium 101A has the flat base plate 102 on which the uniformly flat electrode 103a in the form of a very thin film is superposed. In addition, the photo-modulation complex film 104 is superposed on the electrode 103a.

Figure 9:
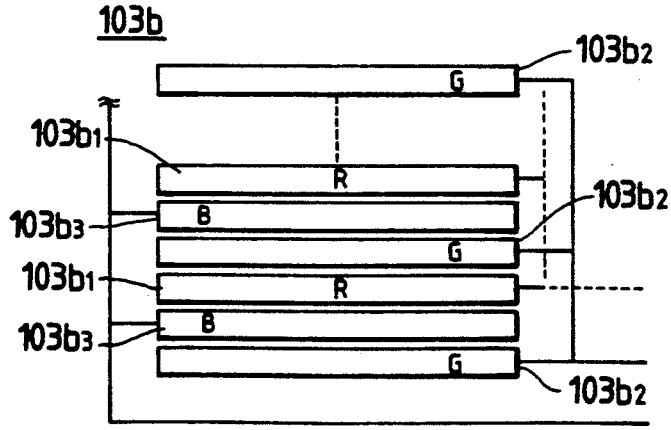
FIG. 9 is a diagram of a recording medium.

In FIG. 8, the recording medium 101B has the flat base plate 102 on which the stripe electrodes 103b are superposed. The color stripe filter 105 is superposed on the electrodes 103b. In addition, the photo-modulation complex film 104 is superposed on the color stripe filter 105. As shown in FIG. 9, the electrodes 103b are composed of separated strip electrodes, and the separated stripe electrodes are arranged in a pattern of recurrent groups each having electrodes $103b_1$, $103b_2$, and $103b_3$ which correspond to respective filter stripes R, G, and B in one group. For example, the electrodes $103b_1$ correspond to the red filter stripes R and the electrodes $103b_2$ correspond to the green filter stripes G, and the electrodes $103b_3$ correspond to the blue filter stripes B. The electrodes $103b_1$, $103b_2$, and $103b_3$ serve as selection electrodes.

During a recording process using the recording medium 101B, in the case where color components R, G, and B of the image information signal are sequentially fed to the recording head 110A or 110B (see FIG. 10 and FIG. 11), filter stripes R, G, and B are sequentially selected by the electrodes $103b_1$, $103b_2$, and $103b_3$, and the information is recorded on the line regions of the photo-modulation complex film 104 which extend directly above the selected filter stripes. Specifically, the electrodes $103b_1$, $103b_2$, and $103b_3$ serve as electric-field selectively applying means. By the electric-field selectively applying operation of the electrodes $103b_1$, $103b_2$, and $103b_3$, the color components R, G, and B of the image information signal are accurately recorded on the line regions of the photo-modulation complex film 104 which align with the filter stripes R, G, and B respectively. As a result, a high-quality color image information can be recorded on and reproduced from the recording medium 101B. In the case where the width of the recording head 110A or 110B (the size of the separated electrodes 112 or the heating resistors 117) is greater than the width (the interval K) of the filter stripes of the color stripe filter 105, even when the recording head 110A or 110B moves out of parallel with the filter stripes of the color stripe filter 105, the agreement between recorded regions of the information color components and the filter stripes can be maintained.

Figure 10:
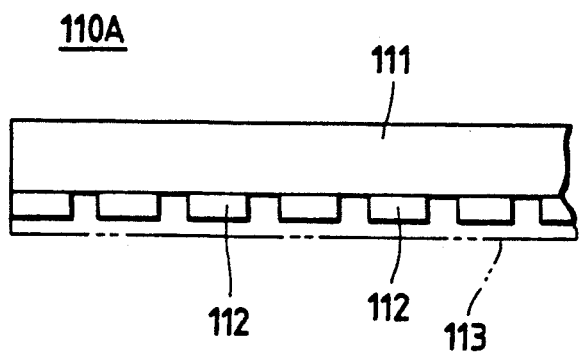
FIG. 10 is a diagram of a recording head.

A further description will be given of the recording heads 110A and 110B with reference to FIGS. 10 and 11. The recording head 110A of FIG. 10 executes the recording of information by generating an electric field. In FIG. 10, the recording head 110A includes a base plate 111 made of ceramics or other materials. A plurality of separated electrodes 112 are fixed to and layered below the base plate 111. The separated electrodes 112 extend along the main scanning direction. In some cases, the separated electrodes 112 are covered with a protective overcoat 113. The separated electrodes 112 correspond to respective pixels for an image information signal to be recorded. By feeding a voltage of the image information signal to the separated electrodes 112, an electric field is applied to the recording medium 101B so that color image information represented by the information signal can be recorded on the recording medium 101B as will be explained later. The density of information dots recorded by the separated electrodes 112 is set to about 8 dot/mm to 16 dot/mm.

Figure 11:
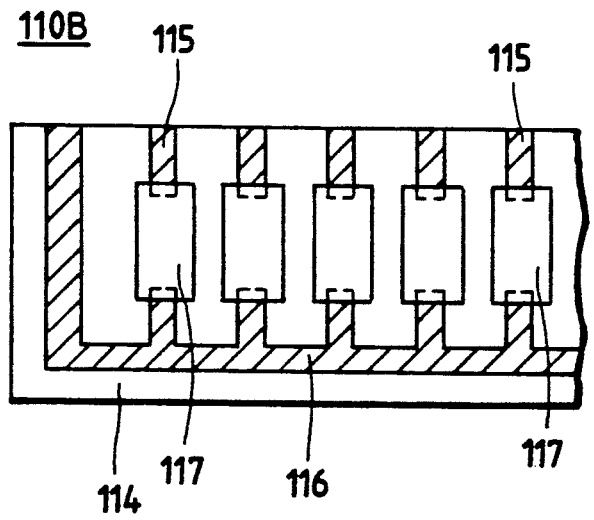
FIG. 11 is a diagram of a recording head.

The recording head 110B of FIG. 11 executes the recording of information by generating heat. In FIG. 11, the recording head 110B includes a base plate 114 on which electrodes 115, a common electrode 116, and heating resistors 117 are arranged. The common electrode 116 opposes the electrodes 115. The heating resistors 117 are connected between the electrodes 115 and the common electrode 116. The heating resistors 117 correspond to respective pixels for an image information signal to be recorded. By feeding the information signal to the electrodes 115 to activate the corresponding heating resistors 117, heat generated by the heating resistors 117 is applied to the recording medium 101A or 101B so that the information recording can be done. The size of information dots recorded by the heating resistors 117 is comparable with the size of the separated electrodes 112 of the recording head 110A.

Figure 12:
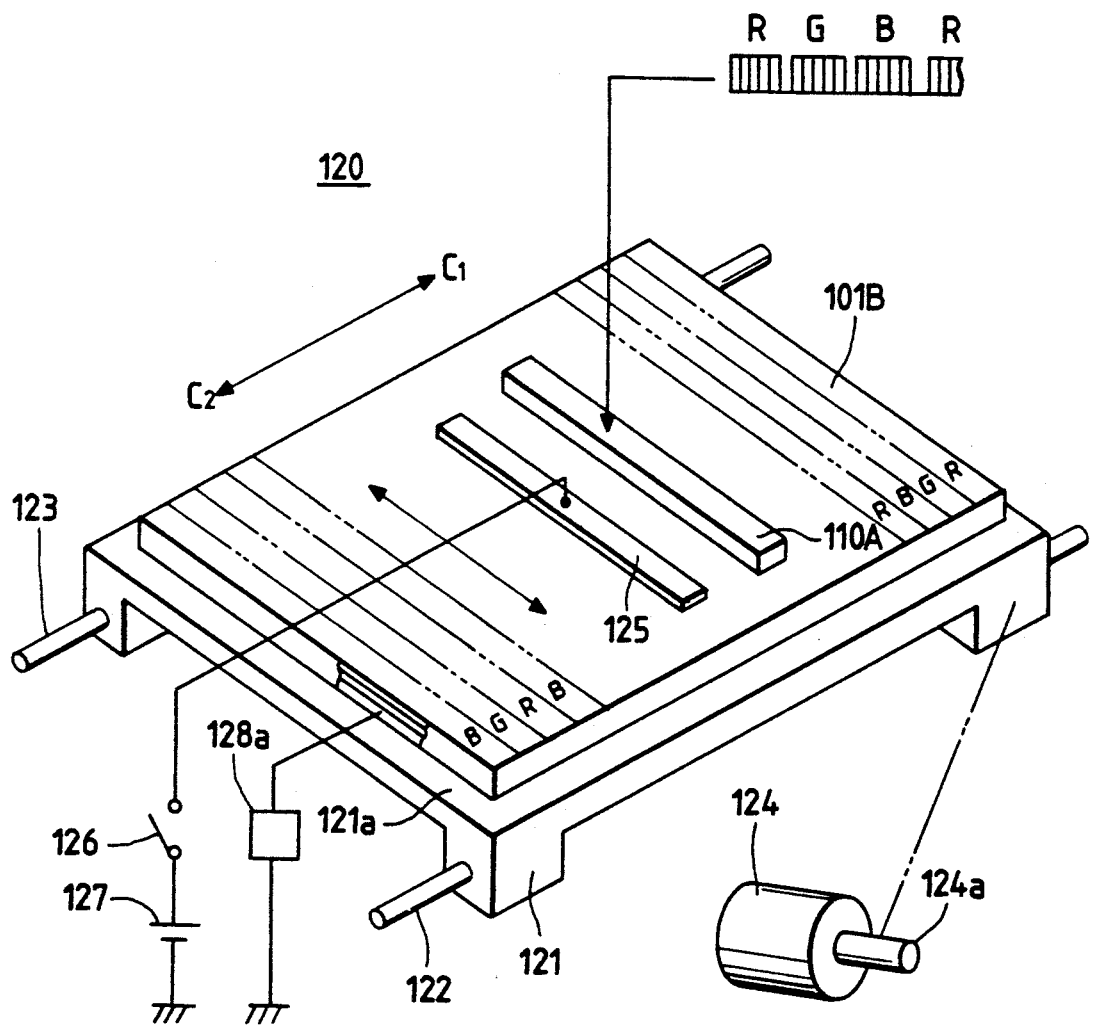
FIG. 12 is a diagram of an information recording apparatus.

With reference to FIG. 12, an information recording apparatus 120 includes a recording medium 101B carried on a carriage 121. While the carriage 121 is moved, the color components R, G, and B of the image information signal are sequentially fed to the recording head 110A so that the electric field depending on the information signal is applied to the recording medium 101B by the separated electrodes 112. It may also be good that, during the recording process, the recording head 110A is moved while the carriage 121 remains fixed.

As described previously, the recording medium 101B is carried on the carriage 121. The recording medium 101B includes the scatter mode photo-modulation member (the photo-modulation complex film) 104.

The carriage 121 is made of metal, having an upper flat surface 121a. The carriage 121 is slidably mounted on a pair of guide rails 122 and 123. The carriage 121 is connected to the shaft 124a of a drive motor 124 by a known transmission mechanism such as a combination of gears, a belt, and pulleys. As the drive motor 124 is rotated, the carriage 121 is slid linearly in the directions C1 and C2.

The recording medium 101B includes separated electrodes $103b_1$–$103b_3$ (see FIGS. 8 and 9) which are connected to an electrode changing means 128a. During the recording process, the separated electrodes $103b_1$–$103b_3$ in the recording medium 101B are sequentially selected by the electrode changing means 128a.

As shown in FIG. 12, an erasing head 125 and the recording head 110A are fixed by holding means (not shown) at locations above the recording medium 101B carried on the carriage 121. The recording head 110A executes the recording of information as the carriage 121 is moved in the direction (the sub scanning direction) C1.

The erasing head 125 is connected to one side of a power supply 127 via a switch 126. The other side of the power supply 127 is grounded. The erasing head 125 serves to return the recording medium 101B to a scattering state before the recording process is started. The erasing head 125 includes a heating member (not shown) which extends along the main scanning direction. The erasing head 125 may be replaced by the design in which the heating resistors 117 of the recording head 110B are used to generate heat for erasing the recorded information from the recording medium 101B and for returning the recording medium 101B to the scattering state.

In the case where the direction of the movement of the carriage 121 which occurs during the recording process is set as the direction C1 (the recording head sub scanning direction), the erasing head 125 is located at a position shown in the drawing. Specifically, the erasing head 125 precedes the recording head 110A in the direction of the movement of the carriage 121 which occurs during the recording process. The erasing process may be executed during the return of the carriage 121 in the direction C2 which occurs after the recording process.

A detailed description will be given of the erasing process and the recording process executed by the information recording apparatus 120. During the erasing process, the switch 126 is closed so that the heating member of the erasing head 125 is activated by the power supply 127. As a result, the heating member of the erasing head 125 generates heat which erases the recorded information from the recording medium 101B. After the heating process, the recording medium 101B cools down into a scattering state (an opaque state) defined in the electric-field dependent characteristics of FIG. 14. The scattering state corresponds to a state where the recorded information is completely erased from the recording medium 101B.

Figure 14:
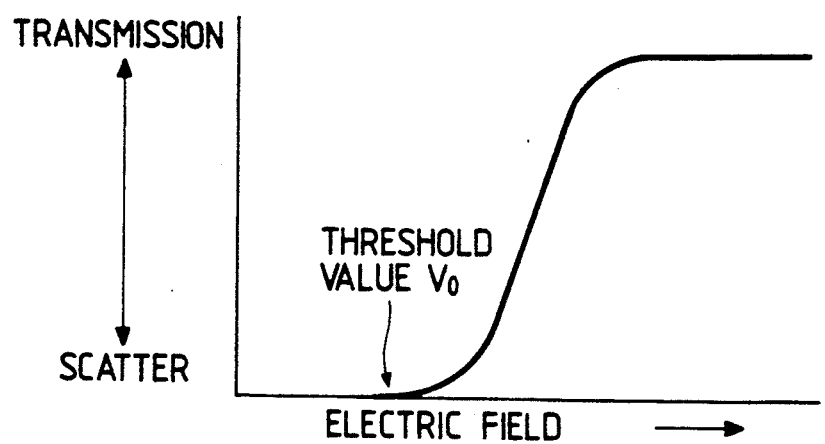
FIG. 14 is a diagram showing the electric-field responsive characteristics of a recording medium.

As understood from FIG. 14, when an electric field stronger than a threshold value V0 is applied to the recording medium 101B, the recording medium 101B is changed to a transparent state. In addition, when a predetermined electric field is applied to the recording medium 101B, the recording medium 101B is changed to a completely transparent state. As shown in FIG. 14, the transmission/scatter conditions of the recording medium 101B vary with the applied electric field along an S-shaped characteristic curve. Thus, the recording medium 101B can be changed among an opaque state, semitransparent states, and a completely transparent state by adjusting the strength of the applied electric field. In this case, image information having a variable tone level can be recorded.

The information recording apparatus 120 executes the erasing process by using the heating process. In addition, the information recording apparatus 120 executes the recording process by applying the electric field. During the recording process, line regions of the recording medium 101B which correspond to respective filter stripes of the color stripe filter 105 are sequentially selected, and the information is recorded on the selected line regions of the recording medium 101B.

Specifically, the voltages of the color components R, G, and B of the image information signal are sequentially and periodically fed to the separated electrodes 112 of the recording head 110A, and thereby variable-tone color image information which corresponds to the color components R, G, and B is recorded on the recording medium 101B by the recording head 110A. The color components R, G, and B are recorded on the line regions of the recording medium 101B which align with the filter stripes R, G, and B of the color stripe filter 105 respectively.

In more detail, the separated electrodes $103b_1$, $103b_2$, and $103b_3$ of the recording medium 101B which correspond to the filter stripes R, G, and B of the color stripe filter 105 are sequentially activated, and the information is sequentially recorded on the line regions of the recording medium 101B which correspond to the activated separated electrodes $103b_1$, $103b_2$, and $103b_3$. The separated electrodes $103b_1$, $103b_2$, and $103b_3$ are sequentially selected by the electrode changing means 128a in synchronism and accordance with the sequential feed of the color components R, G, and B of the information signal to the recording head 110A. During the feed of the color components R to the recording head 110A, the separated electrodes $103b_1$ are selected and activated so that the information of the color components R is recorded on the line region of the recording medium 101B which aligns with the filter stripe R extending directly below the recording head 110A. Next, during the feed of the color components G to the recording head 110A, the separated electrodes $103b_2$ are selected and activated so that the information of the color components G is recorded on the line region of the recording medium 101B which aligns with the filter stripe G extending directly below the recording head 110A. Subsequently, during the feed of the color components B to the recording head 110A, the separated electrodes $103b_3$ are selected and activated so that the information of the color components B is recorded on the line region of the recording medium 101B which aligns with the filter stripe B extending directly below the recording head 110A. These processes are reiterated. Since the separated electrodes $103b_1$-$103b_3$ are grounded via the electrode changing means 128a, the electric field depending on the information signal is applied between the recording head 110A and the selected electrodes $103b_1$-$103b_3$. The electric field is focused on the line region of the recording medium 101B which aligns with the recording head 110A and one of the filter stripes R, G, and B. Thus, the color components R, G, and B of the information signal can be accurately recorded on the line regions of the recording medium 101B which align with the filter stripes R, G, and B of the color stripe filter 105 respectively.

With reference to FIG. 18, an OHP information reproducing apparatus 140 includes a casing 141, a lens 142, and a mirror 143. The recording medium 101B which previously stores color image information is placed on the upper surface of the casing 141. The recording medium 101B is exposed to light emitted from a light source (not shown) disposed within the casing 141. The recorded color image information is projected onto a screen (not shown) by the lens 142 and the mirror 143.

Figure 13:
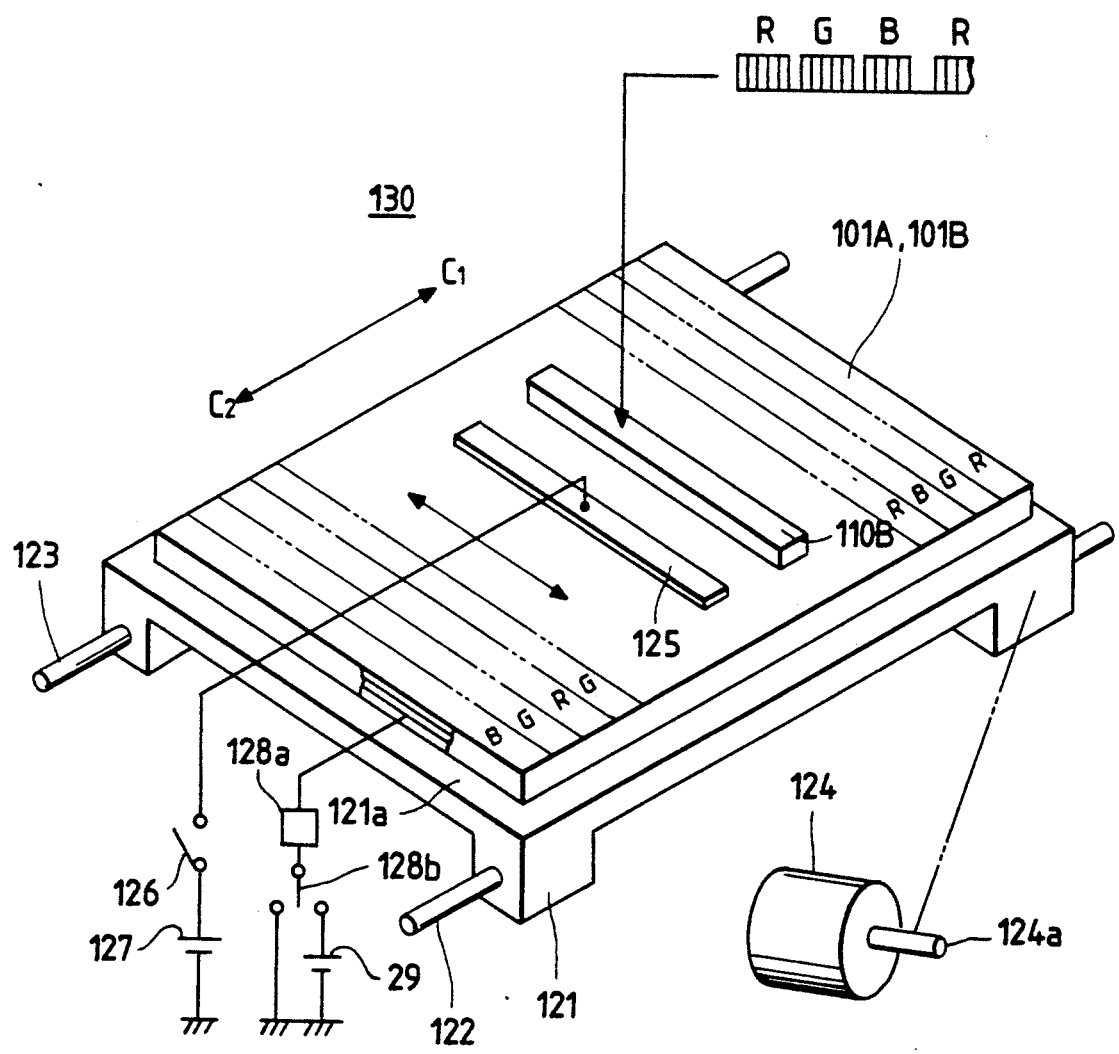
FIG. 13 is a diagram of an information recording apparatus.

FIG. 13 shows an information recording apparatus 130 which is similar to the information recording apparatus 120 of FIG. 12 except for design changes indicated hereinafter. As shown in FIG. 13, the information recording apparatus 130 includes a flat carriage 121 on which a recording medium 101A or 101B is placed.

A recording head 110B is fixed above the recording medium 101A or 101B placed on the carriage 121. The recording head 110B is held by a suitable device (not shown). The recording head 110B executes a recording process as the carriage 121 is moved in the direction C1 (the sub scanning direction).

In the case where the recording medium 101A is placed on the carriage 121, the electrode 103a of the recording medium 101A is connected to an electrode changing means 128a and a switch 128b. The switch 128b is selectively connected to a power supply 129 or grounded. In the case where the recording medium 101B is placed on the carriage 121, the electrodes 103b of the recording medium 101B are connected to the electrode changing means 128a and the switch 128b.

Before a recording process is started, an erasing head 125 returns the recording medium 101A or 101B to a scattering state (an opaque state) and thereby erases the recorded information from the recording medium 101A or 101B.

Figure 15:
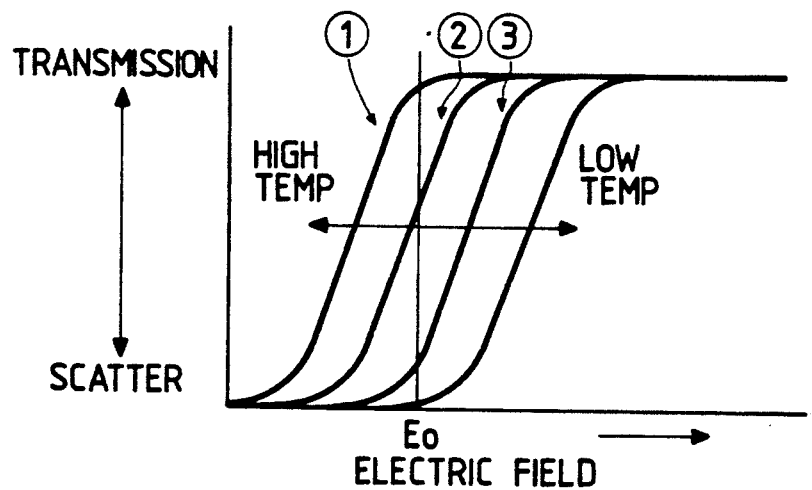
FIG. 15 is a diagram showing the electric-field and temperature responsive characteristics of a recording medium.

FIG. 15 shows the results of experiments related to the relation between the scatter/transmission conditions of the photo-modulation complex film 104 and the strength of the electric field applied to the photo-modulation complex film 104. At a high temperature, the scatter/transmission conditions of the photo-modulation complex film 104 vary with the strength of the applied electric field along the curve ① of FIG. 15. At an intermediate temperature, the scatter/transmission conditions of the photo-modulation complex film 104 vary with the strength of the applied electric field along the curve ② of FIG. 15. At a low temperature, the scatter/transmission conditions of the photo-modulation complex film 104 vary with the strength of the applied electric field along the curve ③ of FIG. 15. As understood from FIG. 15, the photo-modulation complex film 104 can be changed among an opaque state (a scattering state), semitransparent states (partial transmission states), and a completely transparent state (a complete transmission state) by adjusting the temperature of the photo-modulation complex film 104. For example, in the case where the strength of the applied electric field remains at a given level EO, the photo-modulation complex film 104 is in the scattering state at the low temperature (the curve ③) and is in the complete transmission state at the high temperature (the curve ①, and the photo-modulation complex film 104 is in the partial transmission state at the intermediate temperature (the curve ②). In addition, the photo-modulation complex film 104 can be changed among an opaque state (a scattering state), semitransparent states (partial transmission states), and a completely transparent state (a complete transmission state) by adjusting the strength of the applied electric field. Thus, simultaneous application of an electric field and an amount of heat to the recording medium 101A or 101B enables easy recording of variable-tone color image information on the recording medium 101A or 101B. In the absence of an applied electric field, the photo-modulation complex film 104 remains in the scattering state independent of the temperature so that the recording process can not be executed.

As shown in FIG. 16, the electrodes 103b ($103b_1$–$103b_3$) of the recording medium 101B are connected to the power supply 129 via the electrode changing means 128a and the switch 128b. The power supply 129 serves to feed a voltage causing the given electric field EO. The color components R, G, and B of the information signal are sequentially and periodically fed to the heating resistors 117 of the recording head 110B via the separated electrodes 115 and the common electrode 116. The heating resistors 117 generate amounts of heat in correspondence with the color components R, G, and B, and the amounts of heat are applied to the recording medium 101B. In this way, the recording medium 101B is simultaneously subjected to the electric field by the power supply 129 and the heat by the heating resistors 117. The applied electric field and heat causes the segments of the recording medium 101B to be made into the scattering state, the semitransparent states, and the completely transparent state in accordance with the color components R, G, and B, so that variable-tone color image information is recorded on the recording medium 101B.

In an arrangement of FIG. 17, separated electrodes 115 and a common electrode 116 are provided on opposite surfaces of a recording head 110B. The separated electrodes 115 are connected to a power supply 129 via an electrode changing means 128a and a switch 128b. The power supply 129 serves to feed a voltage causing the given electric field EO. Since the impedance of the heating resistors 117 of the recording head 110B is negligible in comparison with the impedance of the recording medium 101B, the electric field can be effectively applied between the recording medium 101B and the recording head 110B. The color components R, G, and B of the information signal are sequentially and periodically fed to the heating resistors 117 via the separated electrodes 115 and the common electrode 116, so that a recording process is executed as in the arrangement of FIG. 16. During the recording process, the recording head 110B is driven by a voltage of about several volts, and the electrode 103a of the recording medium 101A or the electrodes 103b of the recording medium 101B are subjected to a voltage of several tens of volts to several hundreds of volts. In other points, the operation of the arrangement of FIG. 17 is similar to the operation of the arrangement of FIG. 16.

Figure 19:
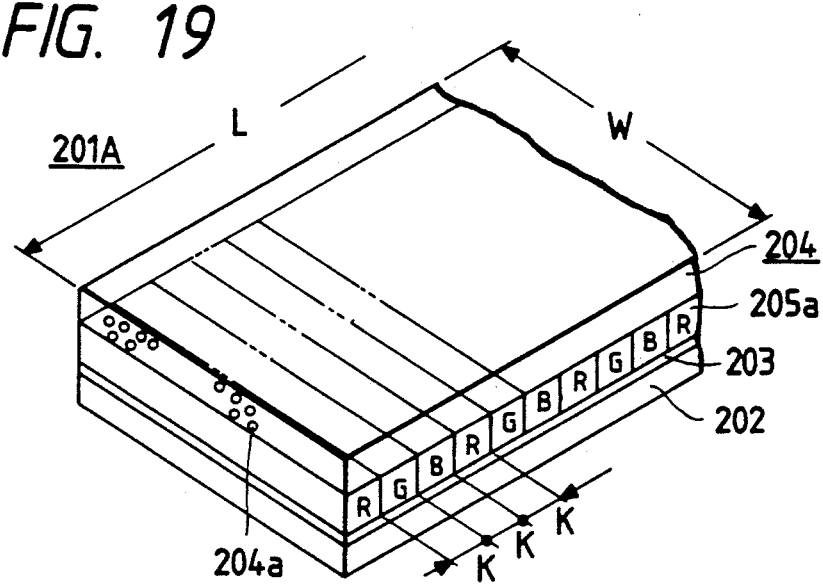
FIG. 19 is a perspective view of a recording medium.

With reference to FIG. 19, a recording medium 201A includes a base plate 202, an electrode 203, a scatter mode photo-modulation member 204, and a color stripe filter 205a.

Figure 20:
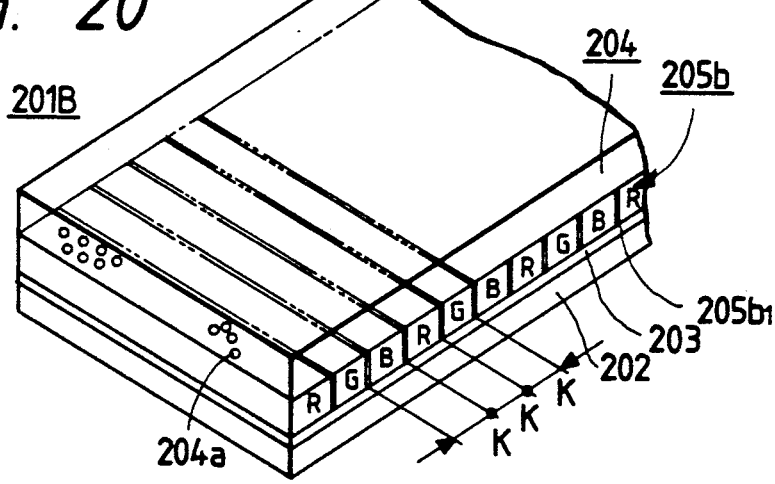
FIG. 20 is a perspective view of a recording medium.

With reference to FIG. 20, a recording medium 201B includes a base plate 202, an electrode 203, a scatter mode photo-modulation member 204, and a color stripe filter 205b.

In FIGS. 19 and 20, the base plate 202 is made of transparent PET (polyethylene terephthalate) material, being formed into a flat plate. In addition, the electrode 203 is composed of an ITO (indium tin oxide) film superposed on the base plate 202.

In FIGS. 19 and 20, the scatter mode photo-modulation member 204 is made of scatter-type photo-modulation material which exhibits the following characteristics. By heating the scatter mode photo-modulation member 204, the optical characteristics of the photo-modulation member 204 change to opaque conditions where it scatters light. In addition, the scattering conditions (the opaque conditions) remain after the photo-modulation member 204 cools down. Furthermore, by applying an electric field to the photo-modulation member 204, the photo-modulation member 204 is changed to a transparent state. After the electric field is removed, the transparent state remains.

The material constituting the scatter mode photo-modulation member 204 is selected from a material containing a complex film of high molecular material and liquid crystal material, a material containing a liquid crystal film, a material containing a ferroelectric liquid crystal film, a PLZT ceramic, a $BaTiO_3$ ferroelectric crystal, a $LiNiO_3$ ferroelectric crystal, a polyvinylidene fluoride ferroelectric material, and a trifluoride ethylene copolymer. In addition, the scatter mode photo-modulation member 204 and the material constituting the scatter mode photo-modulation member 204 may be those shown in U.S. patent application Ser. No. 542,213 filed on Jun. 22, 1990, the disclosure of which is hereby incorporated by reference.

During an erasing process, a recording process, or a reproducing process, the recording medium 201A or 201B is changeable between an opaque state where the recording medium 201A or 201B scatters light and a transparent state where the recording medium 201A or 201B transmits light.

A description will be given of the case where the scatter mode photo-modulation member 204 is composed of a complex film of high molecular material and liquid crystal material. The high molecular material in the photo-modulation complex film 204 is selected from various substances such as methacrylic resin, polyester resin, vinyl chloride resin, polyamide resin, polyethylene resin, polypropylene resin, polystyrene resin, and silicone resin. The high molecular material has pores or small holes 204a filled with nematic liquid crystal. The photo-modulation complex film 204 may be a mixture of acrylic resin and smectic liquid crystal.

The small holes 204a in the photo-modulation complex film 204 have diameters equal to or smaller than about 0.5 micrometers, so that image information can be recorded at a high resolution. When the photo-modulation complex film 204 is heated, the photo-modulation complex film 204 is changed to an opaque state where the photo-modulation complex film 204 scatters light. When an electric field is applied to the photo-modulation complex film 204, the photo-modulation complex film 204 is changed to a transparent state where the photo-modulation complex film 204 transmits light.

In FIG. 19, the color stripe filter 205a is layered between the electrode 203 and the photo-modulation complex film 204. In FIG. 20, the color stripe filter 205b is layered between the electrode 203 and the photo-modulation complex film 204. In FIG. 19 or 20, the color stripe filter 205a or 205b may be superposed on the photo-modulation complex film 204.

In FIGS. 19 and 20, the color stripe filters 205a and 205b include recurrent groups each having filter stripes of colors which corresponds to color components of an information signal fed to a recording head 210A and 210B (see FIG. 22 and FIG. 23) described later. The recurrent groups of the filter stripes are arranged along a longitudinal direction L of the recording medium 201A or 201B. In the case where the color components of the information signal fed to the recording head 210A or 210B correspond to a red signal component, a green signal component, and a blue signal component, the colors of the filter stripes in one group correspond to red, green, and blue. In this case, as shown in the drawings, the red filter stripes R, the green filter stripes G, and the blue filter stripes B are formed linearly along a width direction W of the recording medium 201A or 201B. In addition, the filter stripes R, G, and B extend along a main scanning direction in which an electrode 212 (see FIG. 22) of the recording head 210A or separated electrodes 214 (see FIG. 23) of the recording head 210B are arranged. Thus, the longitudinal direction of the filter stripes R, G, and B agrees with the longitudinal direction of the recording heads 210A and 210B.

The filter stripes R, G, and B have filter stripe widths K comparable to the width of the electrode 212 of the recording head 210A and the size of the separated electrodes 214 of the recording head 210B. In general, the width of the electrode 212 or the size of the separated electrodes 214 is chosen so as to correspond to a density or resolution of about 8 dot/mm to 16 dot/mm. The colors of the color stripe filters 205a and 205b are not limited to red, green, and blue, and may be other colors.

The recording medium 201A and the recording medium 201B will be further described. In FIG. 19, the recording medium 201A has the flat base plate 202 on which the uniformly flat electrode 203 in the form of a very thin film is superposed. In addition, the color stripe filter 205a is superposed on the electrode 203. Furthermore, the photo-modulation complex film 204 is superposed on the color stripe filter 205a. As described previously, the color stripe filter 205a includes recurrent groups each having filter stripes R, G, and B. During a recording process, in the case where color components R, G, and B of an information signal are sequentially and periodically fed to the recording head 210A or 210B (see FIG. 22 and FIG. 23), the color components R, G, and B are recorded on the line regions of the recording medium 201A which align with the filter stripes R, G, and B respectively. As a result, high-quality color image information can be recorded on the recording medium 201A.

In FIG. 20, the recording medium 201B has the flat base plate 202 on which the uniformly flat electrode 203 in the form of a very thin film is superposed. In addition, the color stripe filter 205b is superposed on the electrode 203. Furthermore, the photo-modulation complex film 204 is superposed on the color stripe filter 205b. As described previously, the color stripe filter 205b includes recurrent groups each having filter stripes R, G, and B. During a recording process, in the case where color components R, G, and B of an information signal are sequentially and periodically fed to the recording head 210A or 210B (see FIG. 22 and FIG. 23), the color components R, G, and B are recorded on the line regions of the recording medium 201B which align with the filter stripes R, G, and B respectively. As a result, high-quality color image information can be recorded on the recording medium 201B.

Figure 21:
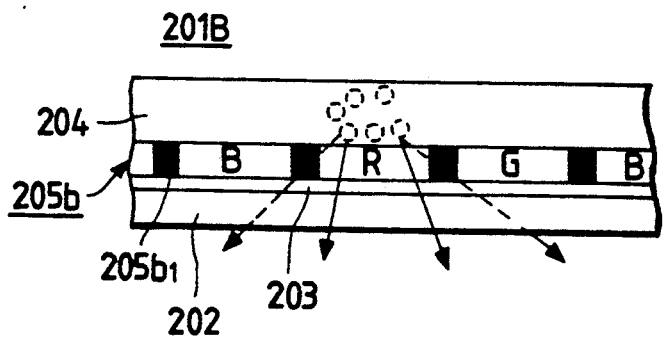
FIG. 21 is a sectional view of a recording medium.

In the color stripe filter 205b, as shown in FIGS. 20 and 21, the filter stripes R, G, and B are separated by opaque or black segments $205b_1$. During a reproducing process, as shown in FIG. 21, the black segments $205b_1$ prevent each one-color portion of the reproduced image information from diffusing out of the corresponding filter stripe into adjacent unrelated filter stripes. As a result, high-quality color image information can be reproduced from the recording medium 201B.

Figure 22:
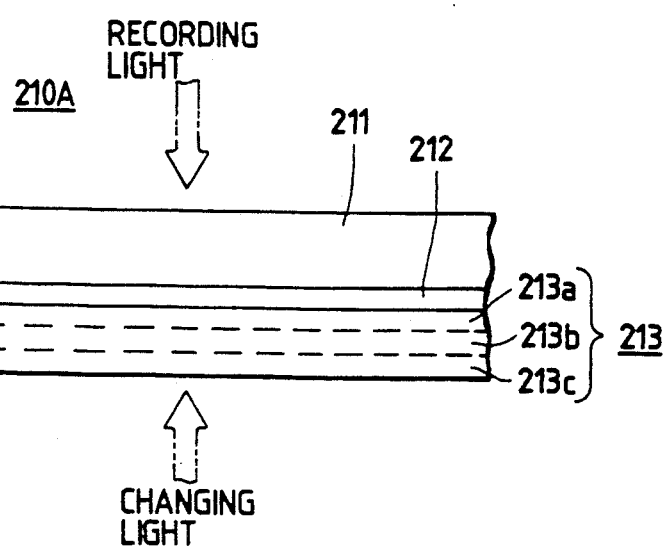
FIG. 22 is a diagram of a recording head.

A further description will be given of the recording heads 210A and 210B with reference to FIGS. 22, 23, and 24. The recording heads 210A and 210B execute the recording of information by generating an electric field. In FIG. 22, the recording head 210A includes a base plate 211 made of ceramics or other materials. An electrode 212 is fixed to and layered below the base plate 211. In addition, a photoconductive layer 213 is fixed to and layered below the electrode 212. The photoconductive layer 213 is made of known photosensitive material. The electrode 212 has a uniform thickness and extends along the main scanning direction. The photoconductive layer 213 includes sub-layers, that is, a charge generating layer 213a, a charge transfer layer 213b, and a charge generating layer 213c.

As shown in FIG. 22, during a recording process, recording light is applied to the base plate 211 from above, and changing light is applied to the photoconductive layer 213 from below. In the photoconductive layer 213, the charge generating layer 213a generates charges in response to the recording light, and the charge generating layer 213c generates charges in response to the changing light. The generated charges cause an electric field depending on the information represented by the recording light. The information represented by the electric field is recorded on the recording medium 201A or 201B by the operation of the electrode 212. The charge transfer layer 213b serves to increase a contrast voltage.

In FIG. 22, the recording light includes an optical information signal separated into a plurality of color components. The amount of charges generated in the charge generating layer 213a depends on the optical information signal, and the electric field also depends on the optical information signal. Thus, the information represented by the optical information signal is recorded on the recording medium 201A or 201B. The changing light is applied to the recording head 210A via the color stripe filter 205a or 205b of the recording medium 201A or 201B. Thus, the different-color beams of the changing light are incident to the recording head 210A. The different-color components of the information are recorded into the regions of the recording medium 201A or 201B which align with the corresponding-color filter stripes respectively.

Figure 23:
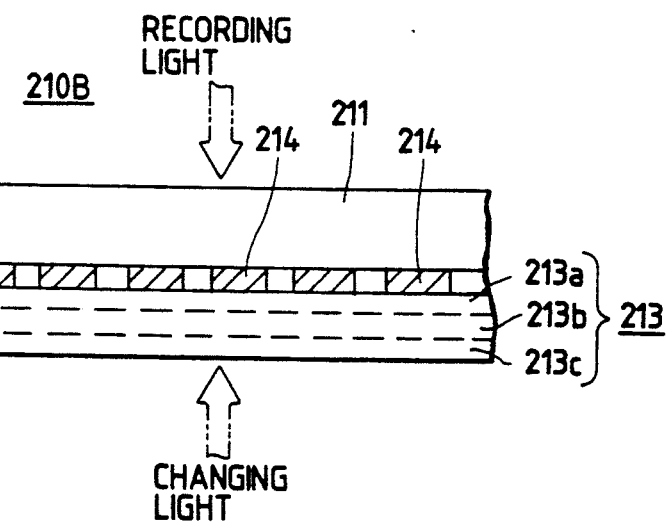
FIG. 23 is a diagram of a recording head.

The recording head 210B of FIG. 23 is similar to the recording head 210A of FIG. 22 except for the following design change. In FIG. 23, the recording head 210B includes separated electrodes 214 which extend between a base plate 211 and a photoconductive layer 213. The separated electrodes 214 are arranged along the main scanning direction (the longitudinal direction). The separated electrodes 214 correspond to respective pixels for an image information signal to be recorded. The density of information dots recorded by the separated electrodes 214 is set to about 8 dot/mm to 16 dot/mm.

A recording process executed by the recording head 210B is of two types. During a first-type recording process, recording light is applied to the base plate 211 from above, and changing light is applied to the photoconductive layer 213 from below. During a second-type recording process, an information signal is fed to the recording head 210B, and changing light is applied to the photoconductive layer 213 from below. In this case, the charge generating layer 213a remains virtually inactive.

Figure 24:
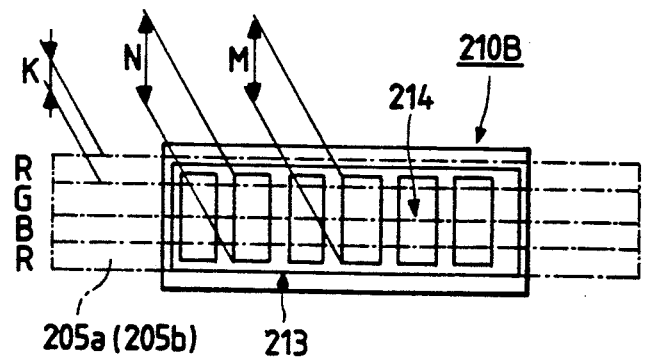
FIG. 24 is a diagram of a recording head.

As shown in FIG. 24, the width M of the separated electrodes 214 and the width N of the photoconductive layer 213 are set greater than the interval (the width) K of filter stripes of the color stripe filter 205a or 205b. Thus, even when the recording head 210B moves out of parallel with the color stripe filter 205a or 205b, the agreement between the information color components and the filter stripes R, G, and B can be maintained.

Figure 25:
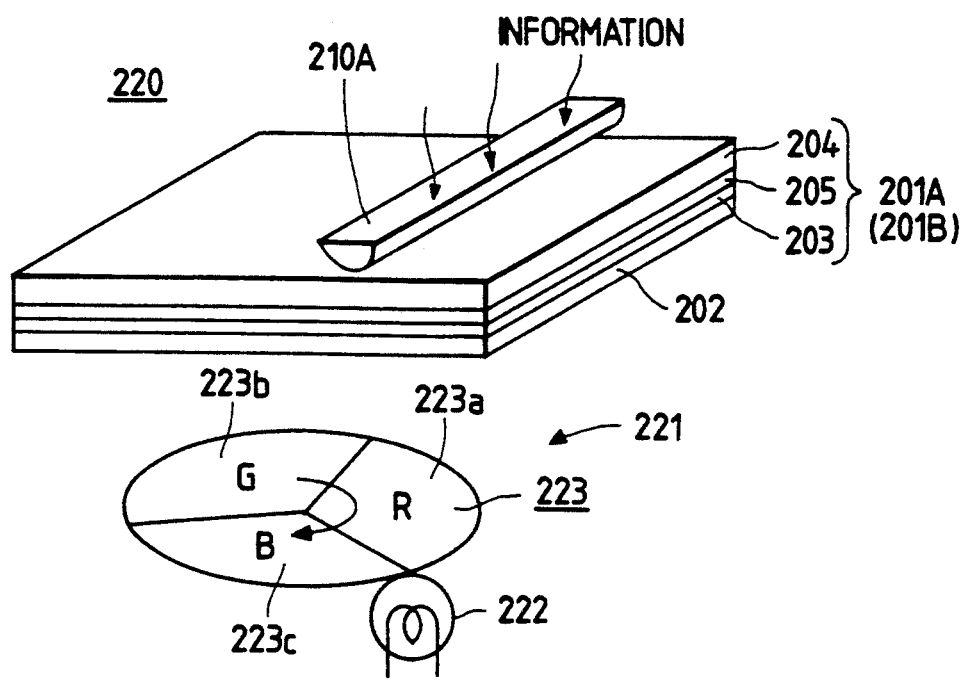
FIG. 25 is a diagram of an information recording apparatus.

With reference to FIG. 25, an information recording apparatus 220 includes a recording medium 201A or 201B, above which a recording head 210A is provided. The recording head 210A is fixed by a suitable holding device (not shown). The recording medium 201A or 201B can be moved in a sub scanning direction by a drive means (not shown).

The recording head 210A receives an optical information signal. A suitable device (not shown) separates the optical information signal into red components R, green components G, and blue components B. The color components R, G, and B of the optical information signal are sequentially and periodically fed to the recording head 210A. The colors of the optical information signal may be different from red, green, and blue.

A changing light means 221 is located below the recording medium 201A or 201B. The changing light means 221 includes a light source 222 and a disc-shaped color separation filter 223. The color filter 223 is located above the light source 222. The color filter 223 has equal-size sectors forming a red filter section 223a, a green filter section 223b, and a blue filter section 223c respectively. The color filter 223 can be rotated in the arrow direction about its center by a drive mechanism (not shown). The changing light means 221 may include LEDs or laser devices for emitting red light, green light, and blue light. In this case, the color filter 223 may be omitted.

The rotation of the color filter 223 is controlled in synchronism with the change of the color components R, G, and B of the optical information signal, so that the following processes will be realized. When the color components R of the optical information signal are fed to the recording head 210A, the color filter 223 assumes a position at which the light emitted from the light source 222 is applied via the R section 223a of the color filter 223 to the recording medium 201A or 201B as changing light. When the color components G of the optical information signal are fed to the recording head 210A, the color filter 223 assumes a position at which the light emitted from the light source 222 is applied via the G section 223b of the color filter 223 to the recording medium 201A or 201B as changing light. When the color components B of the optical information signal are fed to the recording head 210A, the color filter 223 assumes a position at which the light emitted from the light source 222 is applied via the B section 223c of the color filter 223 to the recording medium 201A or 201B as changing light.

A detailed description will be given of an erasing process and a recording process executed by the information recording apparatus 220. During the erasing process, an erasing head (not shown) including a heating member heats the recording medium 201A or 201B and thereby erases the recorded information from the recording medium 201A or 201B. After the heating process, the recording medium 201A or 201B cools down into a scattering state (an apaque state) defined in the electric-field dependent characteristics of FIG. 14. The scattering state corresponds to a state where the recorded information is completely erased from the recording medium 201A or 201B.

As understood from FIG. 14, when an electric field stronger than a threshold value VO is applied to the recording medium 201A or 201B, the recording medium 201A or 201B is changed to a transparent state. In addition, when a predetermined electric field is applied to the recording medium 201A or 201B, the recording medium 201A or 201B is changed to a completely transparent state. As shown in FIG. 14, the transmission/scatter conditions of the recording medium 201A or 201B vary with the applied electric field along an S-shaped characteristic curve. Thus, the recording medium 201A or 201B can be changed among an opaque state, semitransparent states, and a completely transparent state by adjusting the strength of the applied electric field. In this case, image information having a variable tone level can be recorded.

During the recording process which is started after the erasing process, the color components R, G, and B of the optical information signal are sequentially and periodically applied to the recording head 210A from above, and variable-tone color image information corresponding to the color components R, G, and B is recorded on the recording medium 201A or 201B. Thus, the recorded color image information depends on the optical information signal. The color stripe filter 205a or 205b of the recording medium 201A or 201B, and the changing light means 221 are operative in the recording of the color image information.

The color components R, G, and B of the optical information signal are recorded on the line regions of the recording medium 201A or 201B which align with the filter stripes R, G, and B of the color stripe filter 205a or 205b. During an initial stage of this recording, the recording medium 201A or 201B is set so that the recording head 210A will be directly above one of the filter stripes R, G, and B of the color stripe filter 205a or 205b which corresponds to the firstly-recorded color components of the optical information signal. Subsequently, as the color components of the optical information signal are changed from ones to others, the recording medium 201A or 201B is moved so that the recording head 210A will be sequentially above the filter stripes R, G, and B of the color stripe filter 205a or 205b.

In more detail, during the R component recording process, the recording medium 201A or 201B is set so that the recording head 210A will be directly above a filter stripe R of the color stripe filter 205a or 205b. Simultaneously, the color filter 23 of the changing light means 221 is set so that the light emitted from the light source 222 will be applied via the R section 223a of the color filter 223 to the recording medium 201A or 201B as changing light. Thus, the R light is incident to the recording medium 201A or 201B. The R light successively passes through the base plate 202, the electrode 203, the filter stripe R of the color stripe filter 205a or 205b, and the photo-modulation complex film 204. Then, the R light is incident to the recording head 210A. The charge generating layer 213c within the recording head 210A generates charges in response to the R light. At the same time, the charge generating layer 213a within the recording head 210A generates charges in response to the color components R of the optical information signal. The generated charges cause an electric field dependent on the color components R of the optical information signal. The electric field acts on the line region of the recording medium 201A or 201B which aligns with the filter stripe R of the color stripe filter 205a or 205b. As a result, the information of the color components R of the optical information signal is recorded on the line region of the recording medium 201A or 201B which aligns with the filter R stripe of the color stripe filter 205a or 205b. Similar processes are executed for the color components G and B of the optical information signal. By sequentially and periodically executing the above-mentioned processes, a frame of color image information can be recorded on the recording medium 201A or 201B.

Figure 26:
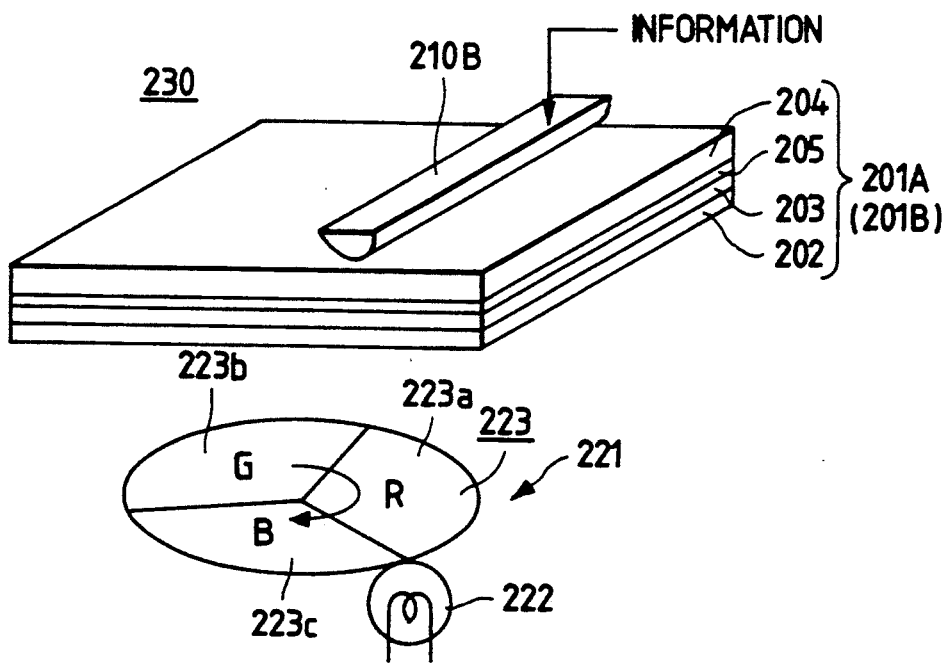
FIG. 26 is a diagram of an information recording apparatus.

FIG. 26 shows an information recording apparatus 230 which is similar to the information recording apparatus 220 of FIG. 25 except for the following design changes. In FIG. 26, the information recording apparatus 230 includes a recording head 210B located above a recording medium 201A or 201B. As described previously, the recording head 210B includes separated electrodes 214. During a first-type recording process, the recording head 210B operates similarly to the operation of the recording head 210A of FIG. 25 and records an optical information signal on the recording medium 201A or 201B. During the first type recording process, the separated electrodes 214 are kept at a common potential.

During a second-type recording process, different-color components of an information signal are sequentially and periodically fed to the recording head 210B, and a changing light means 221 is controlled in accordance with a change between the color components of the information signal. Specifically, the color components R, G, and B of the information signal are sequentially and periodically fed to the separated electrodes 214 of the recording head 210B. A charge generating layer 213c within the recording head 210B generates charges in response to changing light applied from the changing light means 221. Thus, an electric field depending on the color components R, G, and B of the information signal occurs between the separated electrodes 214 and the charge generating layer 213c. The electric field acts on the recording medium 201A or 201B, so that color imag information represented by the information signal is recorded on the recording medium 201A or 201B.

What is claimed is:

1. A method of recording color image information on a recording medium including a color stripe filter having different-color filter stripes, comprising the steps of:
   providing marks on the recording medium in correspondence with the filter stripes of the color stripe filter;
   detecting the marks on the recording medium;
   recording color line sequential signals on the recording medium; and
   synchronizing said recording of the color line sequential signals with said detecting of the marks on the recording medium.

2. A method of recording color image information on a recording medium including a color stripe filter having different-color filter stripes, comprising the steps of:
   providing an electrode in the recording medium, the electrode having separated stripes corresponding to the respective filter stripes of the color stripe filter;
   sequentially feeding different-color line sequential signals to a recording head to sequentially record the line sequential signals on the recording medium; and
   sequentially applying a voltage to the stripes of the electrode in accordance with a change between the different-color line sequential signals.

3. A method of recording color image information on a recording medium including a color stripe filter having different-color filter stripes, comprising the steps of:
   applying light to a recording head via the recording medium;
   sequentially feeding different-color components of image information to the recording head; and
   changing a color of the light in accordance with a change between the different-color components of the image information.

* * * * *